Aug. 16, 1932.  C. M. WAITE  1,871,639
STALL FOR STARTING RACE HORSES
Filed April 13, 1928  2 Sheets-Sheet 1
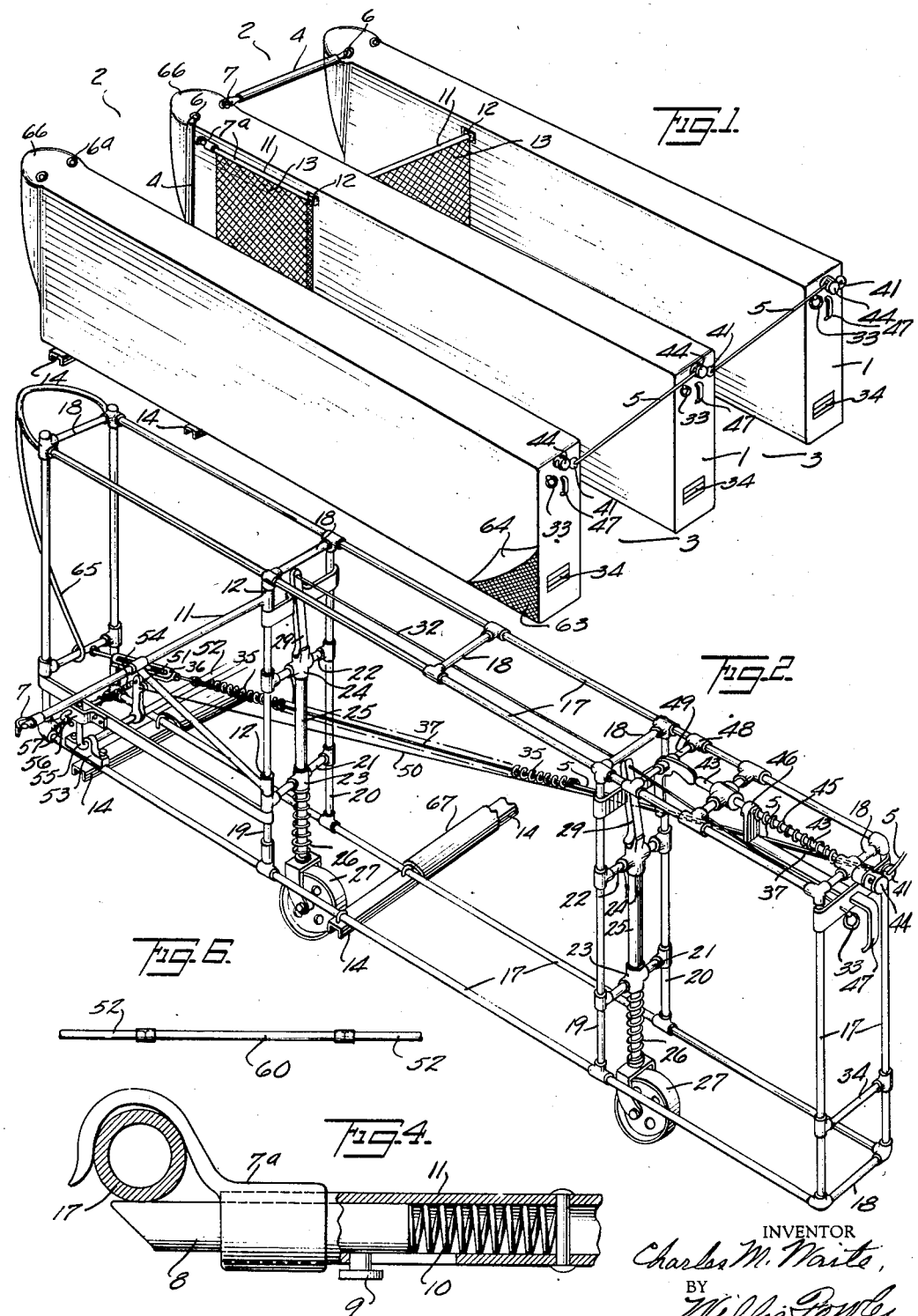
INVENTOR
Charles M. Waite,
BY
ATTORNEY

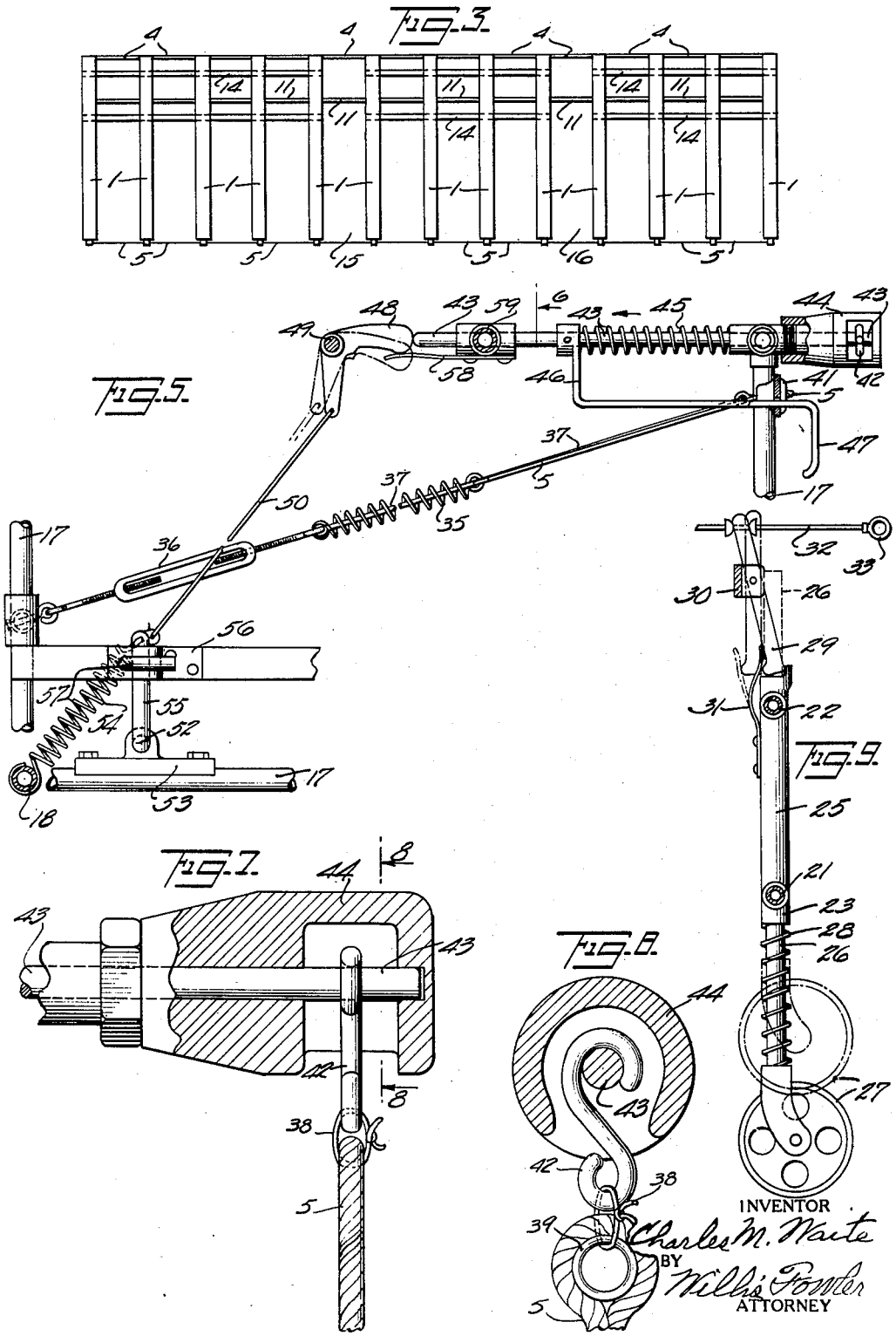

Patented Aug. 16, 1932

1,871,639

UNITED STATES PATENT OFFICE

CHARLES M. WAITE, OF WOODHAVEN, NEW YORK

STALL FOR STARTING RACE HORSES

Application filed April 13, 1928. Serial No. 269,650.

My invention relates generally to race horse starting apparatus which has been developed by the modern practice of operating race-tracks and which affords much control over the horses in lining them up at the starting point.

By means of my present improvements there is obtained practically complete control over the horses at the start and greater facility is given in placing the horses in their assigned positions at the line, and little time and labor are required in assembling my mechanism on the track to start the horses and then to remove it after the start. Other important advantages derived from the use of my inventions will appear hereinafter in the detailed description of my improvements.

I have illustrated a type of my invention in the accompanying drawings, wherein;

Figure 1 shows a perspective view of a unit of two of my improved starting stalls with the rear and front openings thereof closed, while the horses stand therein ready for the starting signal. In this figure the stalls are shown with their wheeling casters retracted so that the bottoms of the side-members of the stalls may rest directly on the ground of the race-track.

Figure 2 shows an enlarged perspective view of one of the skeleton side-members of the stalls, with the ground-wheels projected in operative positions for wheeling the stalls over the ground.

Figure 3 shows on a reduced scale, a top plan view of my improved assembled stalls to the number of twelve, with the rear and front openings closed, ready for the start.

Figure 4 is an enlarged detail view of the bolt which is spring-actuated and is mounted on the free end of the swinging member on which the mat at the rear of the stall is placed, the view being partly in section and partly broken away.

Figure 5 shows an enlarged detail view in side elevation, of the mechanism for withdrawing the barrier or girdle which restrains the horse at front exit until the start, said mechanism being arranged within the skeleton side-member, as shown in Fig. 2.

Figure 6 is a detail view of a portion of the universal barrier withdrawing bar, and shows how the same may be coupled together between the stall-units, when they are assembled.

Figure 7 shows an enlarged sectional view of the releasable fastener for holding the free end of the barrier when closed, a portion of the barrier being shown therewith.

Figure 8 shows a vertical sectional view of the parts shown in Figure 7, the plane of the section being at right-angles to that of Figure 7, and on a plane indicated by the line 8—8, Figure 7.

Figure 9 shows a detail view in side elevation of one of the spring-actuated retractible casters of the side-members of the stalls, the retracted position of the caster being shown in dotted-lines and its wheeling position on the ground being shown in the full lines.

Referring to the drawings, 1 indicates the side-member of a starting stall, a pair of said members being placed side-by-side parallel with each other and with their ends in alinement to form a stall, as indicated in Figures 1 and 3. Each stall has a rear entrance at 2, and a front exit at 3, the entrance being closed by a swinging member 4 and the exit by a retractible barrier or girdle 5, thus providing a four-sided enclosure or box-stall for the horse, which enters from the rear, when the closure is open, and starts from the front, when the barrier is withdrawn. The closure 4, for the entrance, is a flexible member or chain covered with soft material, such as a rubber hose, and is hinged at 6, to the frame of the side-member (Fig. 1), with its free end provided with an ordinary snap-hook 7, which locks with a fixed part 6ª, on the opposite side-member of the stall, when closed, as indicated in Figs. 1 and 3. The closure 4, is opened by hand to admit the horse and is then closed, so that it confines the horse in the stall and at the same time serves to hold the two side-members together in upright positions.

Near the rear end of each stall is arranged a swinging support 11, hinged to an upright of the side-member at 12, and provided at its free end with a snap-hook 7ª, having its spring bolt 8, provided with a knob 9, by means of which the bolt is withdrawn by hand against the action of the spring. The spring bolt locks with a fixed part on the opposite side-member so as to hold the support 11, from which is suspended a heavy knicking-mat 13, of suitable material, such as cocoa, and this mat serves to protect the horse from injuring himself when he kicks backwardly. This support also serves to secure the side-members together at a high point some distance from the rear ends, so that it aids in lending strength to this knock-down type of structure of my portable starting stalls. The front ends of the stall side-members are also given a desirable stability in holding their proper positions before the start, by virtue of the barrier 5, connected to said sides at their tops.

The stall side-members 1, 1, are secured together at their bottoms near the rear ends, by means of cross bars 14, in the form of channel-bars with their flanges projecting downwardly and taking into the ground with a gripping effect which serves to hold the united sides front shifting as a unit on the ground of the race-track when the stalls are placed in position for the start of a race. As I prefer to associate the stalls in units of two stalls or more, say up to the number of five, the cross-bars 14, are in such cases long enough to take in all stalls of such units, and strengthen the structure accordingly, as each side-member is fixedly secured to the cross-bars, but in a manner such as to have the same releasable, when desired.

The assemblage of the stall units which vary in the number of stalls in a unit, is shown in Figure 3, wherein at the left-hand end of the view there is shown a unit of four-stalls, composed of five side-members 1; then a unit of three-stalls and one of three-stalls at the right-hand end, and as the space between adjacent units, indicated at 15 and 16, respectively, is utilized as a box-stall, by means of the rear-gates 1, 1, the mat supports 11, and the barriers 5, 5, this provides a series of twelve starting stalls, made up from a set of three stall-units. As the unit groups can be handled readily, this gives great facility in setting up a large number of stalls in a quick and expeditious manner and with less labor than if each stall should be set up separately at the time of starting a race. Thus the group units of stalls have an important advantage in apparatus of this class.

An effective stabilizing element for the stall side-members is provided by having the basal areas thereof of a considerable width which added to the required length gives extended contact between the standing side-members and the ground upon which they rest on the track. Moreover, the side-members being formed of open frame-work, as hereinafter described, the bottom bars or rails thereof sink into the ground of the race-track sufficiently to increase the frictional contact with the ground, thereby enabling them to resist being displaced or accidentally moved by a horse pushing or knocking against them.

The side-member 1, of the stalls consists in an open frame structure which may be made from pieces of wood or metal. For this purpose, I am now using three-quarter inch pipe of metal, from which I make duplicate rectangular frames 17, 17, which are connected together rigidly in parallel relation by cross pipe sections 18, so as to form a six-sided cage-like structure having substantially the dimensions of from ten to eleven feet in length, ten to eleven inches in width and about forty inches in height.

Vertical brace-pieces 19, 20, are secured opposite each other to the top and bottom rails of the frames 17, and strengthen the structure at intermediate points. Upon the members 21 and 22, secured horizontally between the braces 19 and 20, are mounted brackets 23 and 24, respectively, for receiving the vertical tube or sleeve 25, in which the stem 26, of the caster 27, is journaled, so that the caster may be readily turned on a vertical axis when the structure is wheeled over the ground. A coiled spring 28, is placed around the caster stem 26, with its upper end against the fixed bracket 23, and its lower end against the yoke of the caster and acts normally to project the same into operative wheeling position (Fig. 2) when relieved of part of the dead weight of the side-member upon which it is mounted, and this automatic operation occurs whenever the operator lifts the side-member so as to raise its bottom off the ground and at which moment the spring itself exerts a lifting force to aid the operator as the casters snap into projected positions. The spring-actuated caster is locked in projected position, (Figs. 2 and 9), by means of a trigger or spring catch 29, pivoted on a part 30, secured between the frames 17. A spring 31, on the tube or sleeve 25, acts upon the trigger so as to keep it pressed into locked position in which it engages the top of the caster-stem 26, when the caster is projected. The caster is retracted when the stall is to be put in place, by means of a manually operated pull-rod 32, having a handle 33, located at the front end of the side-member for convenient access by the operator who pulls the rod and unlocks the caster, at the same time the side-member is lowered by grasping the handle bar 34, one of which is located at the front of the side-member and another at the rear, and depressing the side-member against the ground.

I prefer to use caster wheels about ten inches in diameter with about two and a half inch tread in order to facilitate trundling the stalls over the ground. Two of the described casters are applied to each side-member of the stall and they are arranged about equal distances from the respective ends thereof, the pull-rod 32, being common to a pair of the casters so as to provide simultaneous operation. With a unit of four stalls, as shown at the right-hand end of Fig. 3, there are ten of the casters so that a large unit like this can be rolled over the ground with much ease and requires little labor to handle it. This is an important advantage in assembling the stalls for a race and then after the start, removing quickly in case the distance of the race requires the horses to cross the starting line in order to reach the finish. For example, in a race where there are seven entries, a unit of four stalls and one of two stalls are wheeled into place at the starting line and secured together with the space between the two units serving as a stall and thus making seven stalls. The width of the stall, including that made up from the space between the units, should be about thirty-eight inches, to accommodate the horse with the jockey mounted thereon and the height of the side-members is such that the jockey's feet in the stirrups clear the tops of the sides.

In order to prevent the horses from coming in contact with parts of the rigid iron structure, I provide the rear ends of the side-members with a holder frame 65, which may be of suitable soft material and this is filled with a body of hair or like soft material so as to form a large pad, 66 as will be understood from Figures 1 and 2, the canvas cover 64, enclosing the same. I also cover the iron channel bars 14, which extend across the bottom of the stalls under the horses feet, with a rubber or similar soft material 67, which may be riveted to the bars.

The barriers or girdles 5 are constructed alike and operate in the same manner. Each one consists in a flexible rope or cable having its inner end connected to a large coil spring 35, which is secured at its other end to a turn-buckle 36, having its inner end attached to a fixed point on the frame 17, and when the barrier is pulled across the exit of the stall to close it, the spring 35, is put under tension and then acts to suddenly retract the barrier when it is freed. This spring is kept in place and prevented from whipping about by its sudden action, by means of a guide cable or wire 37, the outer end of which is secured to a fixed point on the frame 17, and its inner end is attached to the turn-buckle 36, by means of which the guide wire is kept taut, the wire being passed through the interior of the coil-spring.

The free end of the barrier passes through a tubular guide 41, fixed on the front end of the side-member and has its end provided with a hook 42, with which it is connected by means of an eye 39, of the barrier and a weak cord 38. This easily broken tie or cord 38, is for the purpose of permitting the horse to rupture it in case he lungs against the barrier and thereby avoids injury to the animal. In the event of the tie being broken, it is easily replaced by an attendant who is prepared to make this repair immediately.

A horizontally reciprocating bolt 43, having a keeper or casing 44, is arranged to be engaged by the hook 42, when the barrier is drawn across the exit to close it, and to hold the barrier closed until released by withdrawal of the bolt. The barrier bolt is mounted in its casing 44, which is secured to a fixed cross-piece 18, of the frame structure, (Figs. 2 and 5), and the bolt is provided with a spring 45, surrounding the bolt with its respective ends bearing against fixed points, the inner one of which is a bracket 46, secured fixedly to the bolt and projecting forwardly to the front of the side-member where it is formed with a handle 47, by means of which the operator pulls the bracket forwardly and compresses the spring, so as to place the bolt under spring tension when in locked position. The bolt is held in shot position by means of an L-shaped trip 48, which rocks on a horizontal axis on the frame 17, on cross-piece 49, and has one end disposed so as to engage the end of the bolt 43, and hold it in locked position, while the other end is connected with a pull-cord 50, which is secured at its other end to a rocking-arm 51, fastened to a rock-shaft 52, mounted across the base of the side-member 1, in bearings 53. A spring 54, connected with the rocking-arm, acts to normally rock the arm backwardly and thereby move the trip 48, out of the path of the bolt and permit its spring to withdraw the bolt from its locked position and thereby release the connected barrier. The rock-shaft 52 is provided with a fixed piece or finger 55, arranged within a bracket 56, on the frame structure, and a hand-pin 57, holds the finger and prevents the spring 54, from drawing back the bolt. The trip 48 is sustained in bolt-locking position, by a spring 58, fixed upon a cross-bracket 59, on the frame and through which bracket the bolt slides (Figs. 2 and 5). The barrier is released by the operator pulling out pin 57, which calls into play the spring 54, and rocks the shaft 52, which is made universal so that all the barriers are simultaneously and quickly withdrawn by its action, thereby affording an even start for all the horses. The rock-shaft extends across the full width of the stall unit on which it is mounted, and where the spaces between the units occur, as at 15 and 16, Fig. 3, a removable section 60, is employed, as indicated in Fig. 6.

The open frame work of which the side-members is constructed, is covered by a sheet of wire-mesh 63, over which is stretched and secured snugly in place, a canvas or fabric cover 64. This improves the appearance of the apparatus when put in place on the race track and it also has a quieting effect on the horses, many of which are very restive and would be apt to be disturbed by an uncovered structure of skeleton form. My apparatus is without over-head parts which might tend to distract the horses, the stalls being low set and unobstructive to the eye. It will also be noted that as the stalls are considerably below the feet of the mounted jockeys, there is very little of the horses concealed from the view of the spectators and this is an advantage in apparatus of this class.

I wish to be understood as not limiting my invention to the specific constructions herein set forth, as it is manifest that various changes may be made in the different parts of the apparatus, without, however, departing from the spirit of my invention.

Having thus described my invention, what I claim and desire to secure by Letters Patent is:—

1. In apparatus of the class described, portable units of one or more stalls having broad-based side members firmly secured together in operative positions so as to rest directly on the ground, and ground-gripping bars secured transversely across the bottoms of two or more of said side members for holding them in place said stalls having a rear entrance and a front exit.

2. In apparatus of the class described, starting stalls having side-members with an entrance at the rear and an exit at the front of each stall, retractile barriers for closing the exits, spring-actuated means for retracting said barriers, means for locking said barriers in closed positions under tension of their springs, and means for simultaneously releasing said barriers for withdrawal by said spring actuated means said releasing means comprising a sectional universal bar having sections mounted across said side-members at the ground line and provided with detachable sections for coupling the said mounted sections between the stall units.

3. In apparatus of the class described, starting stalls having side-members with an entrance at the rear and an exit at the front, retractile barriers for said exits and spring-actuated means for retracting them, means for holding the barriers closed, means for releasing said barriers, and a universal bar at the rear for controlling said releasing means, said universal bar being mounted across the bottoms of said side-members and serving also to keep them stable.

4. In apparatus of the class described, starting stalls having side-members consisting in frames having crosspieces connecting them together in spaced apart relation and providing a six-sided open work structure, spring-actuated retractible casters for said members, retractible barriers for closing the stall exit and mounted on said side-member, means for locking and releasing said barriers, the said parts being mounted on and housed by said open work structure.

5. Horse-race starting stalls comprising portable units of one or more stalls each having a rear entrance and a front exit, said stalls having suitably spaced sides adapted to rest directly on the ground when in position for starting a race, the width of the resting base of said sides being comparatively wide in proportion to the height to laterally stabilize the same, and connecting means extending across and secured to the bottoms of adjacent stall sides at the ground level to hold them in upright position during transportation and operation, and disposed at the rear of said stall so as to leave the ground forward thereof unobstructed for the horse to stand on, said connecting-means being capable of serving as the sole fixed connection between said sides.

6. Horse-race starting stalls comprising movable units of one or more stalls each having suitably spaced vertical sides provided with relatively broad bottoms for resting on the ground, each stall having a rear entrance and a front exit, and connecting means extending across the bottoms of adjacent stall sides and secured thereto over a considerable distance of the lengths of said sides and to the rear of the place where the horse stands so as to leave the ground and stall space forward of said means clear of obstruction, said connecting-means being capable of serving as the sole fixed connection between said sides to provide a rigid and stable structure.

7. Horse-race starting stalls comprising movable units of one or more stalls each having suitably spaced sides formed of open frame work having a substantially wide skeleton bottom for resting on the ground, each stall having a rear entrance and a front exist said frame-work having spaced longitudinal bottom bars, and a series of widely spaced connecting members extending across said bottom-bars of said framework and secured thereto in trussed relation for uniting the sides and sustaining them firmly in upright positions.

8. Horse-race starting stalls consisting in portable units of one or more stalls having suitably spaced sides provided with broad bottoms for resting on the ground, each stall having a rear entrance and a front exist, means connecting the bottoms of adjacent sides together so as to maintain them in upright positions and unobstructive of the stall space above the ground level, and said sides being provided with retractile ground-wheels with means for projecting them and holding them projected during transportation of said unit, said stall sides resting upon the ground when the ground-wheels are retracted.

9. Horse-race starting stalls having sides provided with bottoms of a width enabling them to stand alone on the ground, cross-connecting bars disposed transversely of said sides and secured to each at the ground level, each side being provided with retractile ground-wheels for trundling the side over the ground, each stall having a rear entrance and a front exit, means for projecting said ground-wheels and holding them projected, means detachably securable between a pair of said sides at the rear for closing the space between them, and a releasable barrier disposed between said pair of sides for temporarily closing the space at the front.

10. Horse-race starting stalls consisting in portable units of one or more stalls having suitably spaced sides provided with broad bottoms for resting on the ground, means connecting the bottoms of opposite sides together so as to maintain them in upright positions, the sides being provided with a set of vertically reciprocating retractile casters having means for projecting them into wheeling positions on the ground, means for locking the casters in projected positions, and connections for simultaneously releasing the casters and said releasing means being accessible to the operator for manipulation when positioning the stalls on the ground.

11. In apparatus of the class described, starting stalls formed in portable units of one or more stalls and transportable as such, said units being capable of assemblage side-by side on the race-track in spaced apart relation so that the space between adjacent units forms a starting stall, each said stall including said inter-unit stall having an entrance at the rear and an exit at the front, and removable barrier means for temporarily controlling said exits.

12. In apparatus of the class described, starting stalls having side members with a rear entrance and a front exit, each exit being provided with a retractile barrier having its retracting means mounted upon one of the stall sides, locking means for the free end of said barrier mounted upon the other stall side for retaining the free end of said barrier, said locking means comprising a horizontally sliding bolt provided with a spring normally acting to retract the bolt, a trigger for directly engaging said bolt and holding it in shot position against the action of the spring, and pull-connections connected with said trigger for actuating it to release the bolt.

13. In apparatus of the class described, portable starting-stalls having side members constructed of box-like open frame-work with a substantial width at the base and arranged so that the open frame-work base rests upon the ground to assist in holding the sides in place on the ground when in position for starting a race, each stall having a rear entrance and a front exit, and cross connecting members secured to each of said side members to unite them and disposed at the bottoms thereof rearwardly of the place from where the horse starts leaving the ground clear in such place for the horse's footing, said connecting-means being capable of serving as the sole fixed connection between said sides.

14. Horse-race starting-stalls comprising portable units of one or more stalls, each stall having parallel vertical sides, with a rear entrance and a front exit, and connecting members extending transversely of said sides and secured thereto so as to unite them, said transverse connecting members being disposed at the base of said sides in contact with the ground when the units are placed thereon for a race and serving to maintain the stall-sides in vertical positions unobstructive of the stall space between said sides when the units are so placed, and leaving the ground where the horse stands in starting position wholly exposed for the horse's footing.

15. Horse-race starting-stalls comprising portable units of one or more stalls, each stall having parallel vertical sides with a rear entrance and a front exit, connecting members extending transversely of said sides and secured thereto so as to unite and sustain them, said transverse connecting members being disposed at the base of said sides in contact with the ground when the units are placed thereon for a race and serving to maintain the stall-sides in vertical positions unobstructive of the stall space between said sides when the units are so placed, and leaving the ground where the horse stands in starting position wholly exposed for the horse's footing, said sides being provided with trundling ground-wheels relatively adjustable vertically with respect to said transverse connecting members, whereby said wheels may be brought into action to transport said units, or said connecting members may be placed in contact with the ground.

16. In apparatus of the class described, portable starting stalls having vertical side members with broad bottoms for resting on the ground and having an entrance at the rear and an exit at the front, means detachably securable between the upper rear part of adjacent side members acting to hold them together when attached thereto, and cross connecting means secured across adjacent side members at a low level for securing them together during transportation and in operation on the race-track, said connecting-means being unobstructive of the stall space thereabove when the apparatus is in operative position on the track.

17. Horse race starting stalls comprising portable sets of stalls each stall having sides provided with ground contacting bottoms of a width permitting the sides to stand alone on the ground and leaving the ground uncovered where the horse stands, said sides being suitably spaced apart to provide stall space having a rear entrance and a front exit, the stall space from the ground up being unobstructed by fixed connections when the stalls are in place for starting a race, and a removable barrier for controlling the exits.

18. In apparatus of the class described, portable sets of starting stalls, each stall comprising vertical side-members spaced apart in parallel relation, and uniting means secured to the respective side members transversely thereof at a low level and substantially rearward of the horse when starting and capable of serving as the sole fixed means for securing said side-members together in operative vertical positions, so that when the stalls are in position on the track for starting a race said uniting means rests on the ground and supports the apparatus.

19. In apparatus of the class described, portable sets of starting stalls, each stall comprising vertical side-members spaced apart in parallel relation, uniting means secured to the respective side-members transversely thereof and constructed and arranged to rest upon the ground and support the side-members in operative vertical positions when starting a race, said apparatus being provided with ground-wheels, the said ground-wheels and uniting means being relatively adjustable vertically, whereby either said ground-wheels or said uniting means may be placed in contact with the ground.

Signed at New Orleans in the parish of Orleans and State of Louisiana this fourth day of April, A. D. 1928.

CHARLES M. WAITE.